United States Patent
Kung et al.

(10) Patent No.: US 8,248,049 B2
(45) Date of Patent: Aug. 21, 2012

(54) NMOSFET-BASE LINEAR CHARGER

(75) Inventors: Nien-Hui Kung, Hsinchu (TW);
Kwan-Jen Chu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 629 days.

(21) Appl. No.: 12/285,186

(22) Filed: Sep. 30, 2008

(65) Prior Publication Data
US 2009/0096434 A1 Apr. 16, 2009

(30) Foreign Application Priority Data

Oct. 16, 2007 (TW) ................................ 96138671 A

(51) Int. Cl.
*G05F 1/573* (2006.01)
(52) U.S. Cl. ........................................ 323/277; 323/303
(58) Field of Classification Search .................. 323/226, 323/273–281, 303
See application file for complete search history.

(56) References Cited

U.S. PATENT DOCUMENTS

| 6,700,361 | B2 * | 3/2004 | Gregorius | 323/282 |
| 7,855,535 | B2 * | 12/2010 | Tiew et al. | 323/274 |
| 2005/0248326 | A1 * | 11/2005 | Bo et al. | 323/274 |
| 2006/0012354 | A1 * | 1/2006 | Nunokawa et al. | 323/273 |

* cited by examiner

*Primary Examiner* — Harry Behm
*Assistant Examiner* — Matthew Grubb
(74) *Attorney, Agent, or Firm* — Rosenberg, Klein & Lee

(57) ABSTRACT

In an NMOSFET-base linear charger, a pair of common gate charging NMOSFET and sensing NMOSFET have their sources coupled together or virtually shorted to each other, so that these two NMOSFETs have a same gate-source voltage and thereby the sensing NMOSFET reflects the drain-source current of the charging NMOSFET on its drain-source current. From the drain-source current of the sensing NMOSFET, a current sensing signal is generated to control the gate voltage of the charging NMOSFET. By implementing the current source with NMOSFETs, the linear charger has smaller die area and less power loss.

8 Claims, 10 Drawing Sheets

NMOSFET-BASE LINEAR CHARGER

FIELD OF THE INVENTION

The present invention is related generally to a linear charger and, more particularly, to an NMOSFET-base linear charger.

BACKGROUND OF THE INVENTION

For charging battery with a lower input voltage by linear charger, lower dropout voltage is necessary and therefore, the die area of the power switch in the linear charger has to be larger for lower dropout voltage. The conventional linear chargers are made by PMOSFET-base current source. To reduce the die area, NMOSFET is better than PMOSFET by the higher mobility. However, the controller and driver are complex in NMOSFET than in PMOSFET by the current sensing accuracy and power consideration. FIG. 1 is a popular structure in linear chargers, for example in U.S. Pat. Nos. 6,522,118, 6,700,324 and 6,407,532, by using PMOSFET, in which a linear charger 100 has a pair of common gate charging PMOSFET 106 and sensing PMOSFET 108 to act as a current source. The charging PMOSFET 106 has a source coupled to a power input terminal 102 and a drain coupled to a power output terminal 104 for supplying a charging current Ic. The sensing PMOSFET 108 also has its source coupled to the power input terminal 102, so the charging PMOSFET 106 and the sensing PMOSFET 108 have a same gate-source voltage Vgs and thereby produce source-drain currents Ic and Is proportional to each other. If a current setting/sensing circuit 112 virtually shorts the drain of the charging PMOSFET 106 to the drain of the sensing PMOSFET 108, the source-drain current Is of the sensing PMOSFET 108 will reflect the charging current Ic more accurately. A resistor 114 is coupled between the current setting/sensing circuit 112 and a ground terminal GND, to receive the source-drain current Is of the sensing PMOSFET 108, to generate a sensed voltage VS to represent the charging current Ic. A loop controller 110 controls the gate voltage VG of the charging PMOSFET 106 in accordance with the output voltage VOUT and the sensed voltage VS, to control the charging current Ic.

When the linear charger 100 is connected with a lower input voltage VIN to charge a battery, it is desired a lower voltage drop of the charging PMOSFET 106 for less power loss. Since the voltage drop of the charging PMOSFET 106 is equal to the product of its on-resistance and current, it is possible to reduce power loss by lower on-resistance or lower charging current Ic of the charging PMOSFET 106. However, while the charging speed depends on the magnitude of the charging current Ic, lower charging current Ic will result in longer charging time of the battery. On the other hand, while the on-resistance of the charging PMOSFET 106 depends on the size of its channel, lower on-resistance requires larger die area, which causes more costs and is disadvantageous to circuit shrinking. For these reasons, it is impossible to further reduce die area and manufacturing costs of the linear charger 100 without increasing power loss and prolonging charging time.

With a same die area, compared with PMOSFET, NMOSFET possess higher mobility and thereby lower on-resistance. In case the current source of a linear charger is implemented with NMOSFETs, instead of PMOSFETs, the die area can be significantly reduced without increasing power loss and prolonging charging time. Unfortunately, NMOSFETs and PMOSFETs have different driving schemes. For instance, when there is no voltage applied to the gate, a PMOSFET is on while an NMOSFET is off. For the charging PMOSFET 106, the charging current Ic can be supplied as long as the gate voltage VG is lower than the input voltage VIN. Nevertheless, if an NMOSFET replaces the charging PMOSFET 106, it will not supply any charging current Ic unless the gate voltage VG is higher than its source voltage, i.e. the output voltage VOUT. Therefore, in some cases where the gate voltage VG is lower than the source voltage VOUT, the NMOSFET will not be active and thus the linear charger will not operate. Obviously, if the PMOSFETs 106 and 108 are directly replaced by NMOSFETs, the controller and driver would be necessarily complicated in view of the accuracy of current sensing and the variation of supply voltage VIN.

SUMMARY OF THE INVENTION

An object of the present invention is to provide an NMOSFET-base linear charger.

Another object of the present invention is to provide a linear charger implemented with smaller die area.

Yet another object of the present invention is to provide a high charging current linear charger.

Still another object of the present invention is to provide a low power loss linear charger.

A linear charger according to the present invention includes a pair of common gate charging NMOSFET and sensing NMOSFET. A loop controller generates a control signal and a driver supplies a driving voltage to the common gate of the charging NMOSFET in accordance with the control signal. The charging NMOSFET generates a charging current and the sensing NMOSFET reflects the charging current on its drain-source current. According to the drain-source current of the sensing NMOSFET, a current sensing signal is generated for the loop controller to determine the control signal.

In an embodiment, a source of the charging NMOSFET is virtually shorted to a source of the sensing NMOSFET, so that these two NMOSFETs exhibit a same gate-source voltage.

In another embodiment, a source of the sensing NMOSFET is coupled to a source of the charging NMOSFET, so that the charging NMOSFET and the sensing NMOSFET exhibit a same gate-source voltage. Preferably, a drain of the charging NMOSFET is further virtually shorted to a drain of the sensing NMOSFET, so that the charging NMOSFET and the sensing NMOSFET exhibit a same gate-drain voltage, thereby reflecting the charging current by the sensing NMOSFET more accurately.

In an embodiment, a linear charger according to the present invention further includes a voltage generator to provide a constant voltage or a variable voltage for the driver to supply a driving voltage higher than the source voltage of the charging NMOSFET.

According to the present invention, a method for controlling a charging current includes generating a control signal, providing a driving voltage in accordance with the control signal, applying the driving voltage to a gate of a charging NMOSFET to generate the charging current, reflecting the charging current in a sensing NMOSFET common gated with the charging NMOSFET, and providing a current sensing signal according to the drain-source current of the sensing NMOSFET to determine the control signal.

In an embodiment, the sensing NMOSFET and charging NMOSFET have their sources coupled together. Preferably, a drain of the charging NMOSFET is further virtually shorted to a drain of the sensing NMOSFET, so that the charging NMOSFET and the sensing NMOSFET exhibit a same gate-drain voltage, and thus the drain-source current of the sensing NMOSFET reflects the charging current more accurately.

According to the present invention, the current source in a linear charger is implemented with NMOSFETs and therefore, not only the die area and power loss thereof are reduced, but also higher charging current can be supplied.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
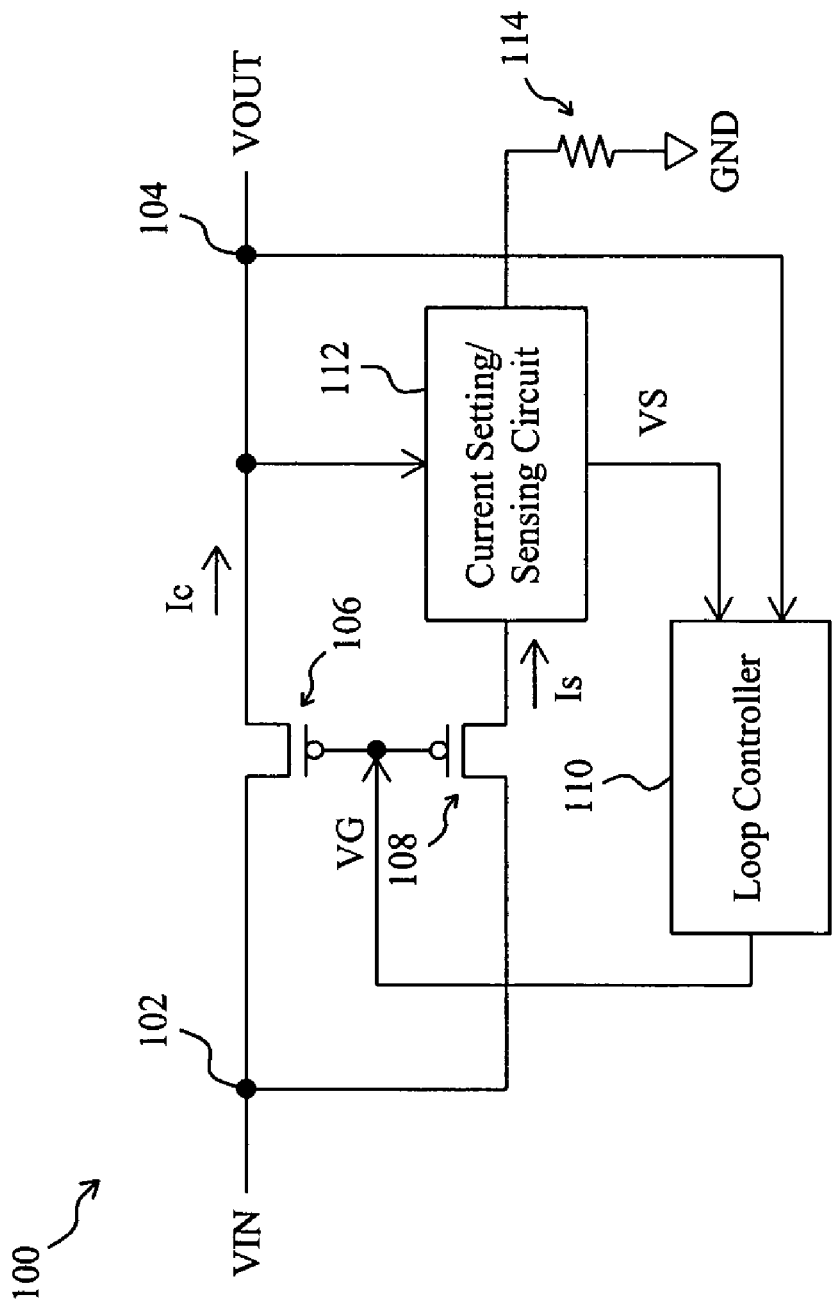
FIG. 1 is a circuit diagram of a conventional linear charger.
Figure 2:
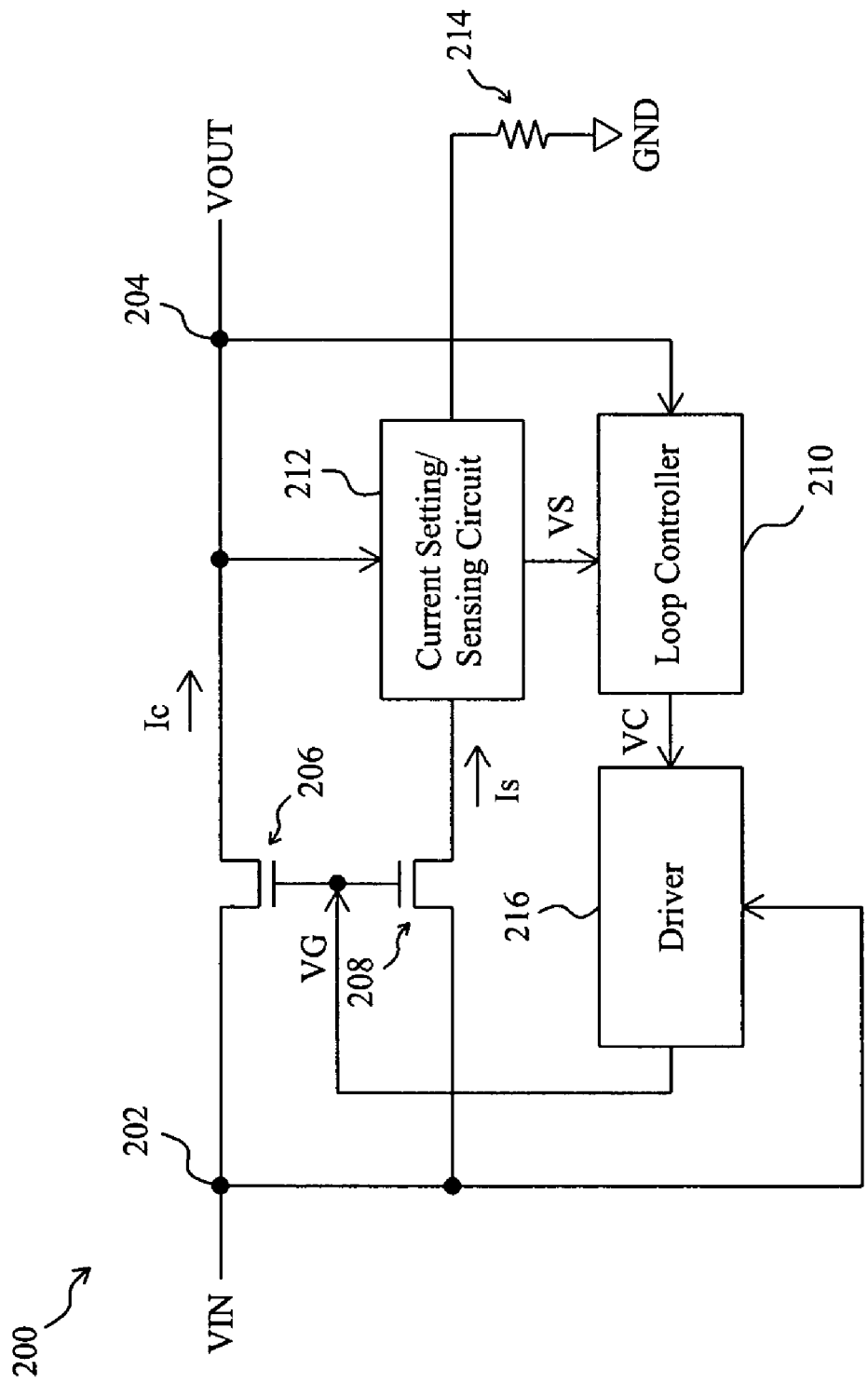
FIG. 2 is a circuit diagram of a first embodiment according to the present invention.

FIG. 2 shows a first embodiment according to the present invention, in which a linear charger 200 includes a pair of common gate charging NMOSFET 206 and sensing NMOSFET 208. The charging NMOSFET 206 has a drain coupled to a power input terminal 202 and a source coupled to a power output terminal 204, to supply a charging current Ic. The sensing NMOSFET 208 has a drain coupled to the power input terminal 202, and a current setting/sensing circuit 212 is coupled between the source of the sensing NMOSFET 208 and the power output terminal 204. By using negative feedback principle, the sensing NMOSFET 208 and the charging NMOSFET 206 have a same source voltage VOUT. Since the charging NMOSFET 206 and the sensing NMOSFET 208 have a same gate-drain voltage and a same gate-source voltage, the drain-source current Is of the sensing NMOSFET 208 will accurately reflect the charging current Ic of the charging NMOSFET 206. In particular, the current ratio of Ic to Is is equal to the size ratio of the charging NMOSFET 206 to the sensing NMOSFET 208. A resistor 214 is coupled between the current setting/sensing circuit 212 and a ground terminal GND, and the current setting/sensing circuit 212 generates a current sensing voltage VS according to the product of the sensed current Is and the resistance of the resistor 214. A loop controller 210 generates a control signal VC according to the output voltage VOUT and the current sensing signal VS, and a driver 216 applies a gate voltage VG to the charging NMOSFET 206 and sensing NMOSFET 208 according to the control signal VC. The gate voltage VG supplied by the driver 216 is higher than the output voltage VOUT to ensure activation of the charging NMOSFET 206.

Figure 3:
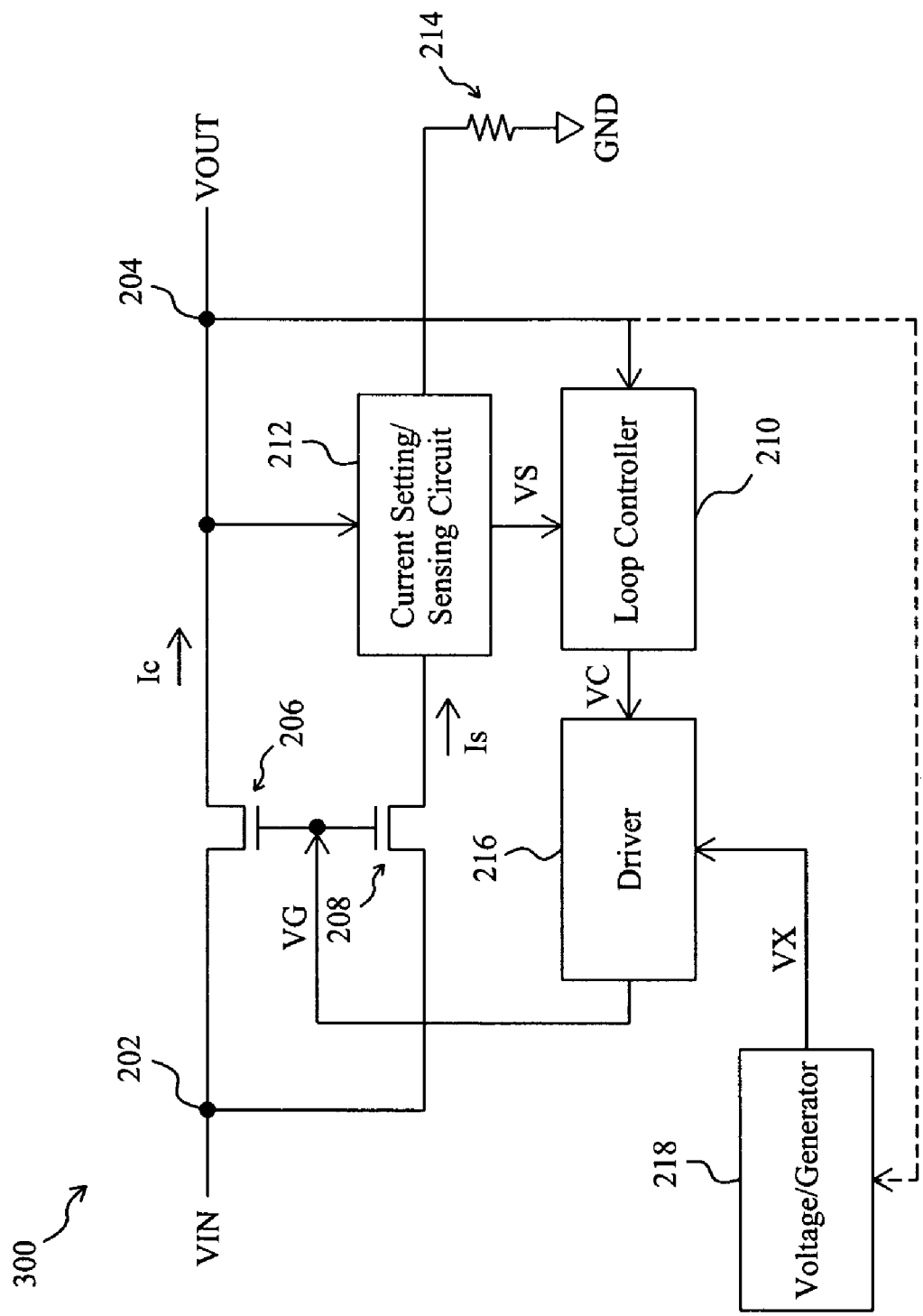
FIG. 3 is a circuit diagram of a second embodiment according to the present invention.

FIG. 3 is a modified embodiment 300, which has the same elements and configuration as in the linear charger 200 of FIG. 2, except that a voltage generator 218 is added to provide a voltage VX higher than the output voltage VOUT for the driver 216, to ensure that the gate voltage VG provided by the driver 216 can turn on the charging NMOSFET 206 without failure. In an embodiment, the gate voltage VG that the driver 216 generates from the supply voltage VX has a maximum value that is higher than the source voltage VOUT by at least a threshold voltage of an NMOSFET, to ensure to activate the charging NMOSFET 206 even when the output voltage VOUT is close to the input voltage VIN. The voltage VX provided by the voltage generator 218 may be either constant or variable with the output voltage VOUT.

Figure 4:
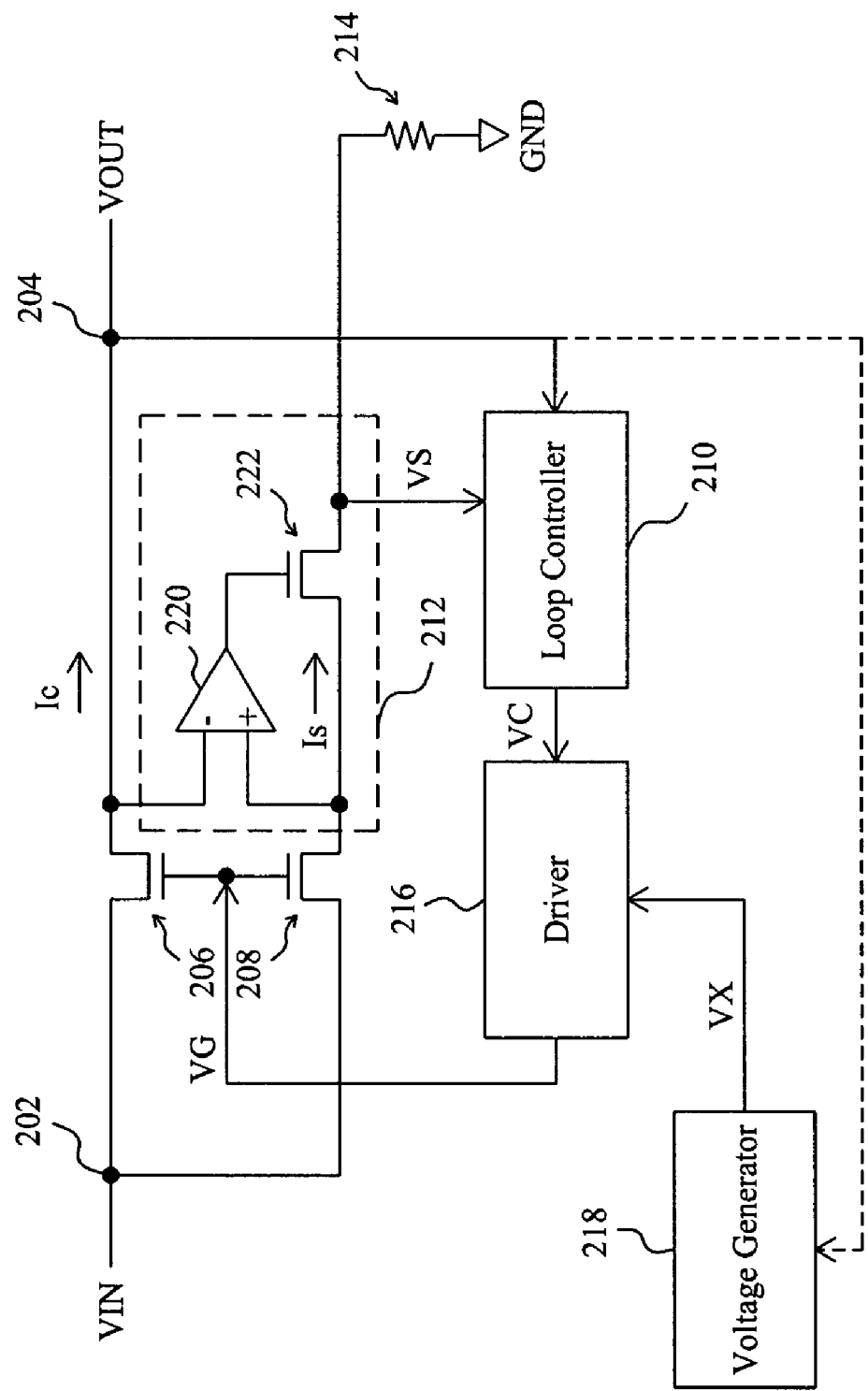
FIG. 4 is a circuit diagram of an embodiment for the current setting/sensing circuit shown in FIG. 3.

As shown in FIG. 4, in an embodiment, the current setting/sensing circuit 212 includes an operational amplifier 220 whose two input terminals are coupled to the power output terminal 204 and the source of the sensing NMOSFET 208 respectively, and an NMOSFET 222 coupled between the source of the sensing NMOSFET 208 and the resistor 214, with its gate coupled to the output terminal of the operational amplifier 220. By using the operational amplifier 220 to virtually short the power output terminal 204 to the source of the sensing NMOSFET 208, the charging NMOSFET 206 and the sensing NMOSFET 208 have the same source voltage VOUT. The drain-source current Is of the sensing NMOSFET 208 flows through the resistor 214 to generate the current sensing signal VS.

In the linear charger of FIG. 4, due to the virtual short of the power output terminal 204 to the source of the sensing NMOSFET 208 by the operational amplifier 220, errors may happen by some reasons. For example, at the beginning stage of charging a battery, if the battery voltage is 0, i.e. the output voltage VOUT is 0, the current sensing signal VS may be incorrect. Consequently, the battery may be damaged by an unduly large charging current Ic or may not be charged because there is no charging current Ic generated. To avoid such uncertainties, at the beginning stage of charging a battery, the loop controller 210 can signal the driver 216 to slightly turn on the charging NMOSFET 206 to generate a small charging current Ic to be reflected in the sensing NMOSFET 208, so that the current sensing signal VS can correctly reflect the charging current Ic, thereby ensuring that the charging NMOSFET 206 is properly activated and surge of the charging current Ic is prevented.

Figure 5:
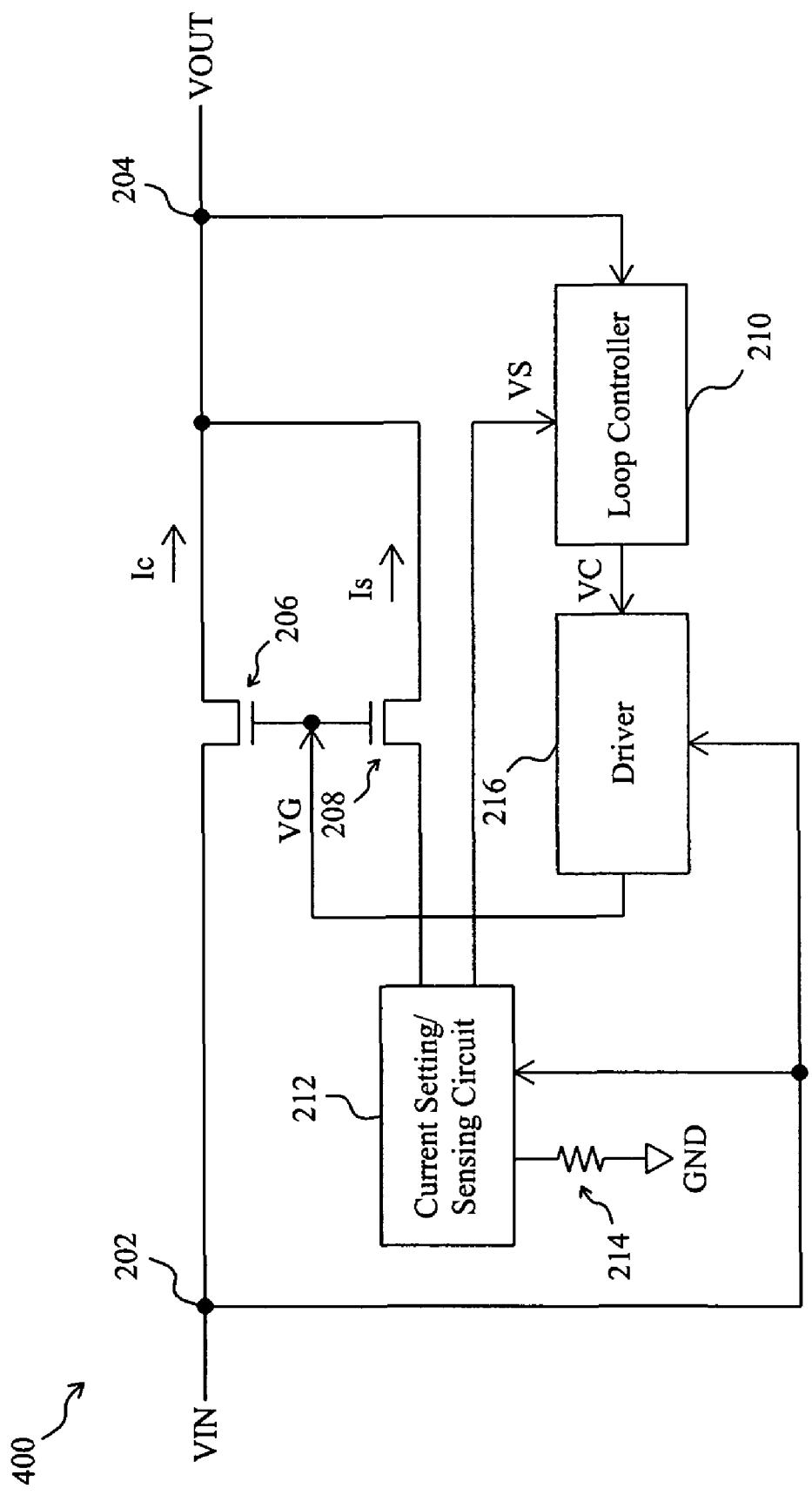
FIG. 5 is a circuit diagram of a third embodiment according to the present invention.

In another embodiment 400 shown in FIG. 5, the charging NMOSFET 206 and the sensing NMOSFET 208 both have sources connected to the power output terminal 204, so they will have a same gate-source voltage and thus the drain-source currents Ic and Is thereof are in a substantially constant proportion that is equal to the size ratio thereof. A current setting/sensing circuit 212 is coupled between a power input terminal 202 and a drain of the sensing NMOSFET 208, and a resistor 214 is coupled between the current setting/sensing circuit 212 and a ground terminal GND. The current setting/sensing circuit 212 provides a current sensing signal VS to a loop controller 210 according to the drain-source current Is and the resistance of the resistor 214. The loop controller 210 generates a control signal VC according to the output voltage VOUT and the current sensing signal VS, and a driver 216 provides a gate voltage VG according to the control signal VC to control the charging NMOSFET 206 and the sensing NMOSFET 208, thereby controlling the charging current Ic. The gate voltage VG provided by the driver 216 is higher than the output voltage VOUT to ensure activation of the charging NMOSFET 206. In an embodiment, the current setting/sensing circuit 212 makes the drain voltage of the sensing NMOS- FET 208 equal to the input voltage VIN, so the charging NMOSFET 206 and the sensing NMOSFET 208 have a same gate-drain voltage and a same gate-source voltage. Thereby, the drain-source current Is of the sensing NMOSFET 208 can reflect the drain-source current Ic of the charging NMOSFET 206 more accurately.

Figure 6:
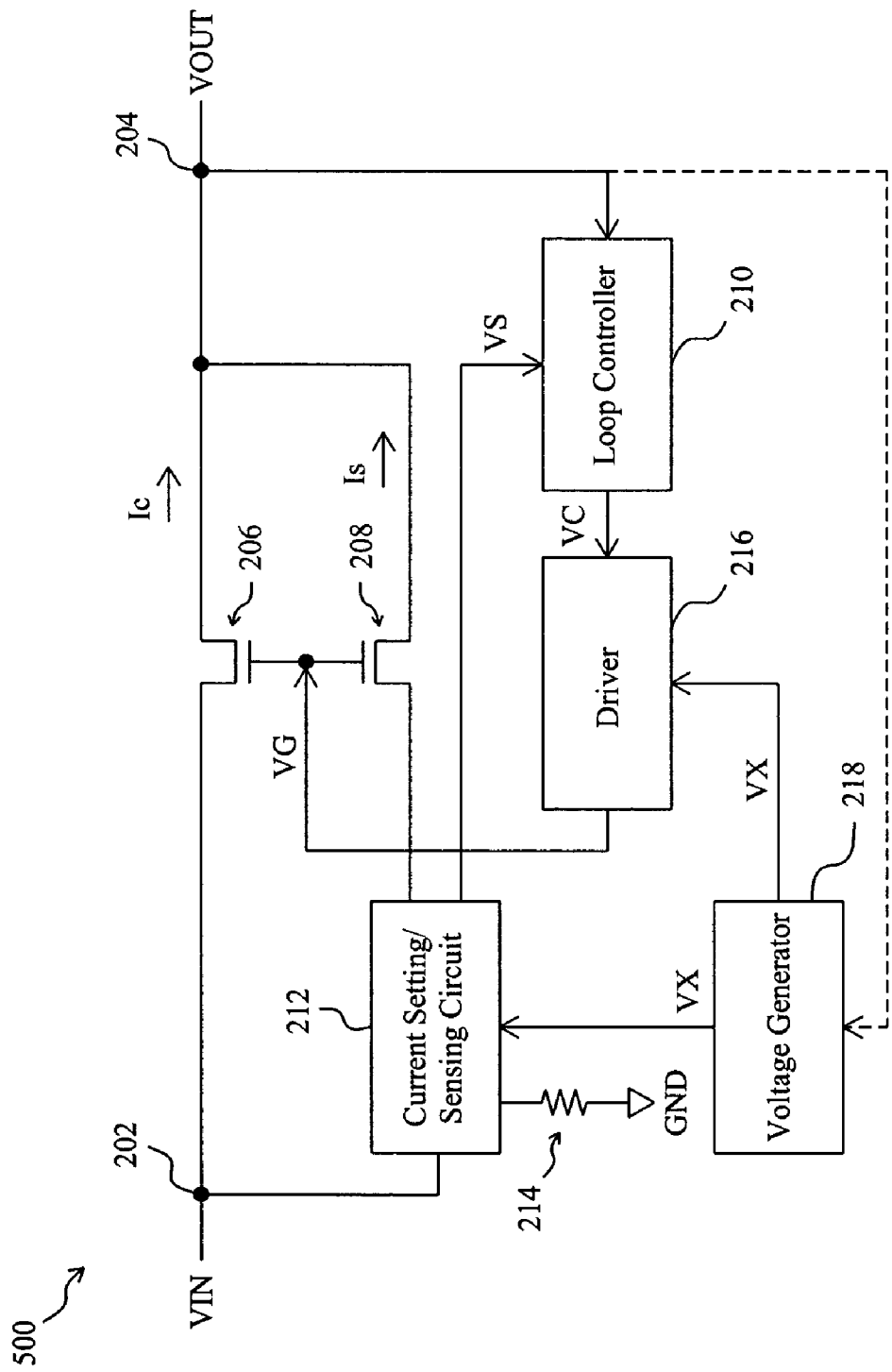
FIG. 6 is a circuit diagram of a fourth embodiment according to the present invention.

The linear charger 500 of FIG. 6 is modified from the embodiment of FIG. 5, in which a voltage generator 218 is added to provide a voltage VX higher than the output voltage VOUT for the driver 216, to ensure that the gate voltage VG of the charging NMOSFET 206 will be higher than the source voltage VOUT of the charging NMOSFET 206 by at least a threshold voltage of an NMOSFET. Thus, the driver 216 can surely turn on the charging NMOSFET 206 without failure whenever it is needed. Alternatively, the supply voltage VX may also be provided for the current setting/sensing circuit 212 as a power source of the latter. The voltage VX provided by the voltage generator 218 may be either constant or variable with the output voltage VOUT.

Figure 7:
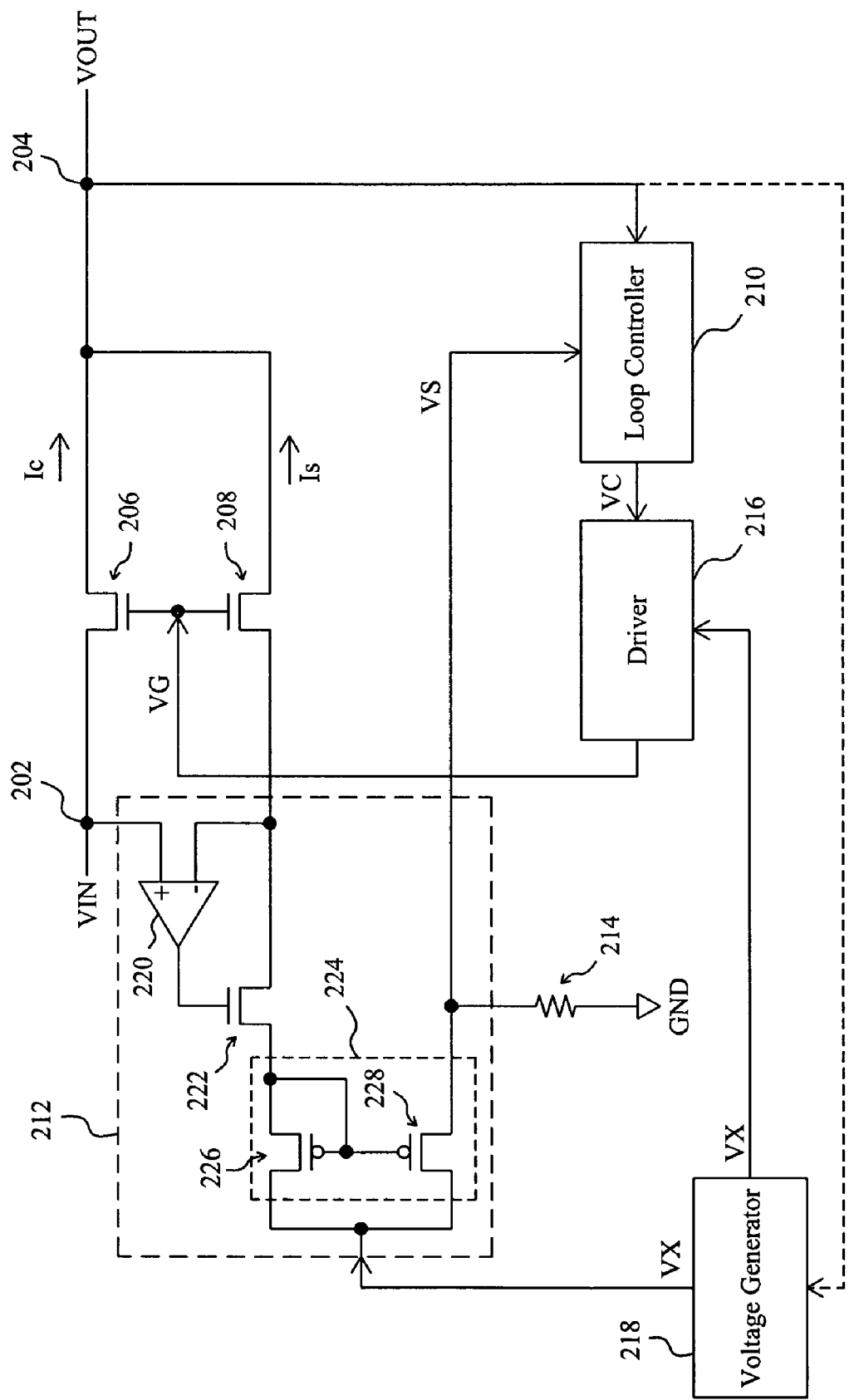
FIG. 7 is a circuit diagram of an embodiment for the current setting/sensing circuit shown in FIG. 6.

In an embodiment, as shown in FIG. 7, the current setting/sensing circuit 212 includes an operational amplifier 220 to virtually short the power input terminal 202 to the drain of the sensing NMOSFET 208 so that the charging NMOSFET 206 and the sensing NMOSFET 208 have a same gate-drain voltage and a same gate-source voltage. Consequently, the drain-source current Is of the sensing NMOSFET 208 will reflect the charging current Ic of the charging NMOSFET 206 more accurately. The output terminal of the operational amplifier 220 is coupled to a gate of an NMOSFET 222 whose source is coupled to the drain of the sensing NMOSFET 208. A current mirror 224 composed of PMOSFETs 226 and 228 is coupled between the voltage generator 218 and the drain of the NMOSFET 222 to mirror the drain-source current Is of the sensing NMOSFET 208 to inject into the resistor 214, to generate the current sensing signal VS. Since the sources of the common gate charging NMOSFET 206 and sensing NMOSFET 208 are coupled together, no matter the output voltage VOUT (or the voltage of the battery being charged) is 0 or any other value, the drain-source current Is of the sensing NMOSFET 208 can accurately reflect the drain-source current Ic of the charging NMOSFET 206, eliminating the concerns about excessively large charging current or no current for charging. The gate voltage VG supplied by the driver 216 has a maximum value higher than the output voltage VOUT to ensure that the charging NMOSFET 206 can be turned on if it is necessary.

Figure 8:
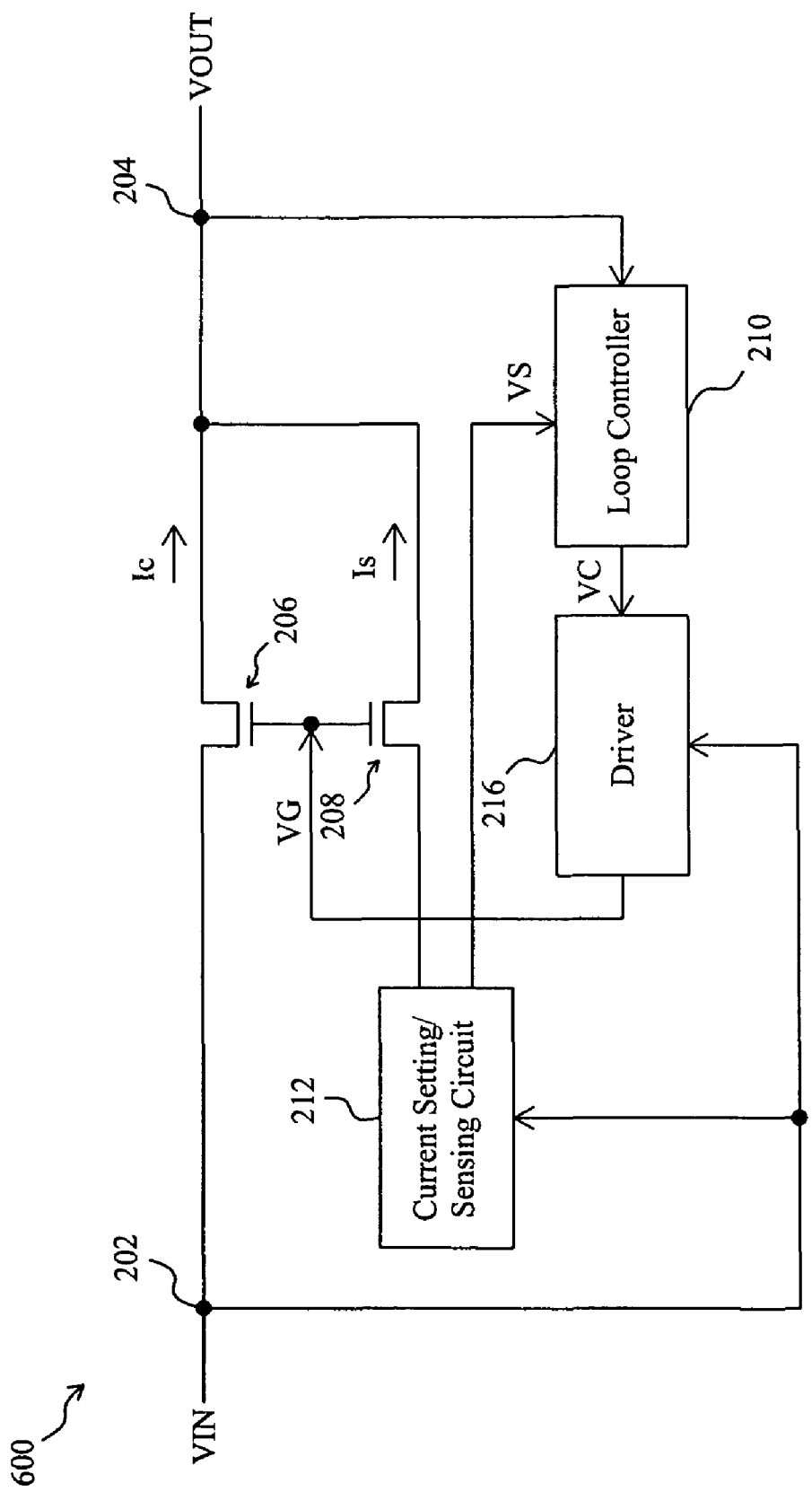
FIG. 8 is a circuit diagram of a fifth embodiment according to the present invention.
Figure 9:
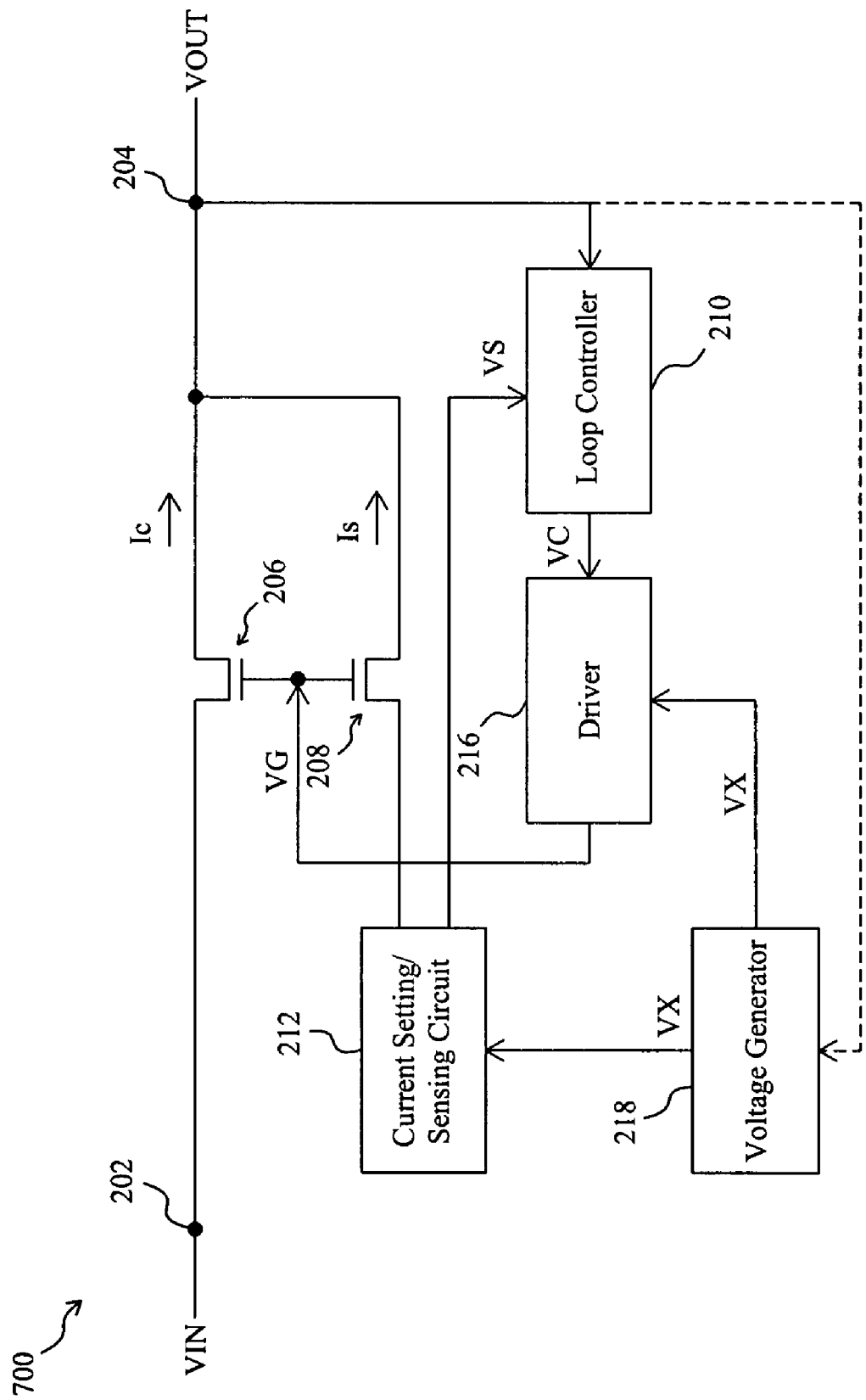
FIG. 9 is a circuit diagram of a sixth embodiment according to the present invention.

In the linear charger 600 of FIG. 8, without use of an additional resistor, the current setting/sensing circuit 212 generates the current sensing signal VS from the drain-source current Is of the sensing NMOSFET 208 to represent the magnitude of the charging current Ic for the loop controller 210. Alternatively, in the linear charger 700 of FIG. 9, a voltage generator 218 provides a voltage VX as the power source of the current setting/sensing circuit 212 and driver 216. The voltage VX provided by the voltage generator 218 is higher than the output voltage VOUT by at least a threshold voltage of an NMOSFET, to ensure that the charging NMOSFET 206 can be turned on by the gate voltage VG without failure if it is necessary. Therefore, even when the output voltage VOUT is close to the input voltage VIN, the driver 216 is still capable of driving the charging NMOSFET 206.

Figure 10:
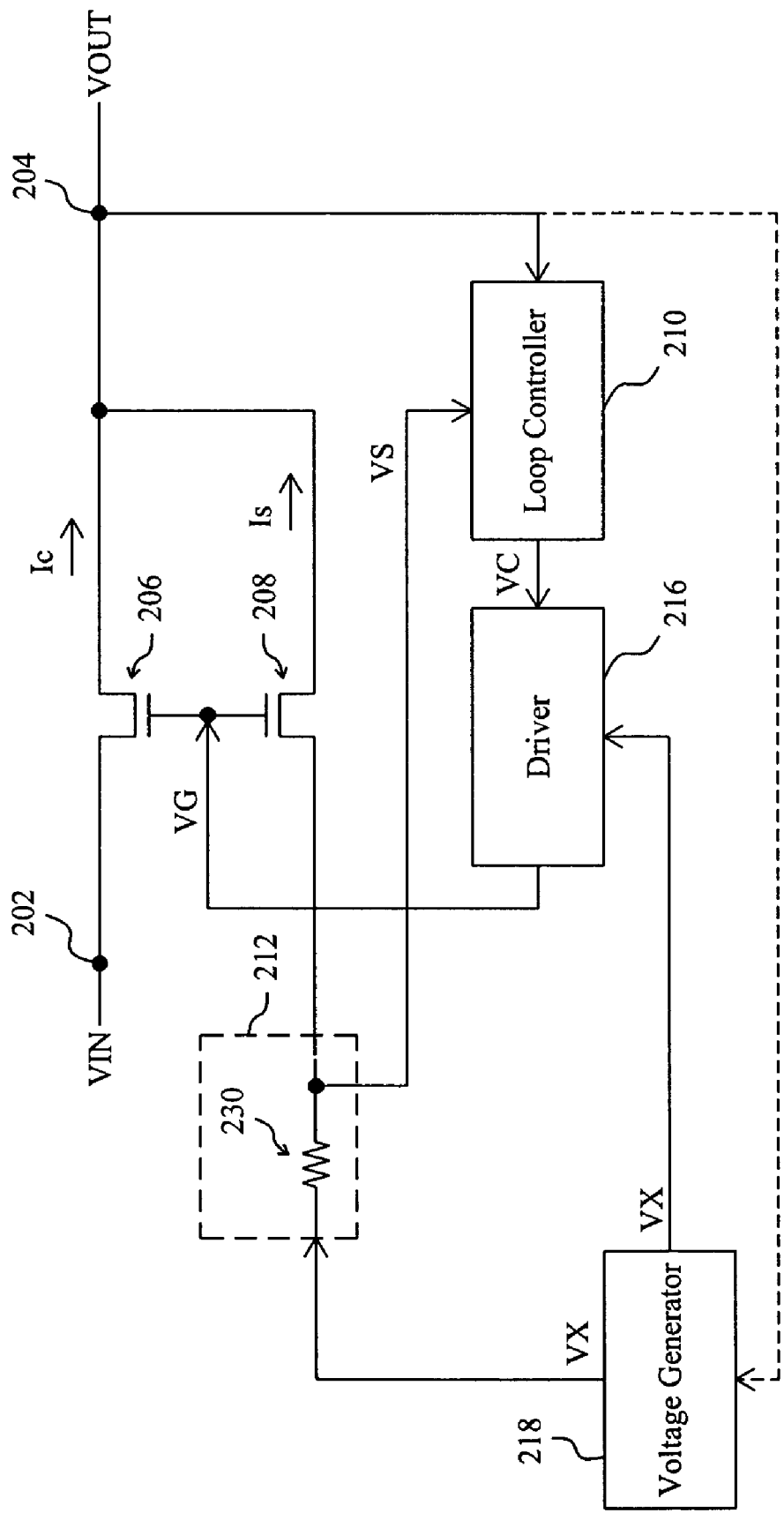
FIG. 10 is a circuit diagram of an embodiment for the current setting/sensing circuit shown in FIG. 9.

In an embodiment, as shown in FIG. 10, the current setting/sensing circuit 212 includes a resistor 230 coupled between the voltage generator 218 and the drain of the sensing NMOSFET 208. The current sensing signal VS is extracted from the drain of the sensing NMOSFET 208. In this embodiment, the current sensing signal VS and the charging current Ic have the relationship Ic=(VX−VS)/R, where R is the resistance of the resistor 230.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A linear charger comprising:
   a power input terminal to receive an input voltage;
   a power output terminal to provide an output voltage;
   a charging NMOSFET having a drain coupled to the power input terminal, a source coupled to the power output terminal, and a gate controlled by a driving voltage to generate a charging current;
   a sensing NMOSFET common gated with the charging NMOSFET;
   a current setting/sensing circuit coupled between the power output terminal and a source of the sensing NMOSFET, to virtually short the power output terminal to the source of the sensing NMOSFET, to thereby have the charging NMOSFET and sensing NMOSFET applied with a same gate-source voltage, for the sensing NMOSFET to reflect the charging current on its drain-source current to provide a current sensing signal accordingly;
   a loop controller coupled to the current setting/sensing circuit, to generate a control signal according to the current sensing signal;
   a driver coupled to the loop controller and the gate of the charging NMOSFET, to supply the driving voltage according to the control signal; and
   a voltage generator coupled to the driver, the voltage generator supplying a voltage to the driver to generate the driving voltage, wherein the voltage generated by the voltage generator is higher than the output voltage.

2. The linear charger of claim 1, wherein the sensing NMOSFET has a drain coupled to the power input terminal.

3. The linear charger of claim 1, wherein the supply voltage generated by the voltage generator is constant.

4. The linear charger of claim 1, wherein the voltage generator is coupled to the power output terminal to generate the supply voltage varying with the output voltage.

5. The linear charger of claim 1, wherein the current setting/sensing circuit comprises an operational amplifier having two input terminals coupled to the power output terminal and the source of the sensing NMOSFET respectively, to virtually short the power output terminal to the source of the sensing NMOSFET.

6. A method for controlling a charging current, comprising the steps of:
   coupling a drain and a source of a charging NMOSFET to a power input terminal and a power output terminal respectively;
   applying an input voltage to the power input terminal;
   generating a control signal;
   supplying a driving voltage according to the control signal;
   applying the driving voltage to a gate of the charging NMOSFET to generate the charging current;
   virtually shorting the power output terminal to a source of a sensing NMOSFET common gated with the charging NMOSFET, to thereby have the charging NMOSFET and the sensing NMOSFET applied with a same gate-source voltage, for the sensing NMOSFET to reflect the charging current on its drain-source current;

providing a current sensing signal according to the drain-source current of the sensing NMOSFET to determine the control signal; and generating a supply voltage higher than an output voltage on the output terminal to generate the driving voltage.

7. The method of claim 6, further comprising coupling a drain of the sensing NMOSFET to the power input terminal.

8. The method of claim 6, wherein the supply voltage varies with the output voltage.

\* \* \* \* \*